United States Patent
Kish, Jr.

(10) Patent No.: US 7,308,909 B2
(45) Date of Patent: Dec. 18, 2007

(54) HIGH PRESSURE THREE WAY VALVE

(75) Inventor: Walter J. Kish, Jr., Las Vegas, NV (US)

(73) Assignee: Kloehn Company, Ltd., Las Vegas, NV (US)

(*) Notice: Subject to any disclaimer, the term of this patent is extended or adjusted under 35 U.S.C. 154(b) by 118 days.

(21) Appl. No.: 11/002,370

(22) Filed: Dec. 2, 2004

(65) Prior Publication Data
US 2005/0126641 A1 Jun. 16, 2005

Related U.S. Application Data

(60) Provisional application No. 60/527,871, filed on Dec. 8, 2003.

(51) Int. Cl.
*F15B 13/04* (2006.01)
(52) U.S. Cl. .............. 137/596.2; 137/596.17; 251/129.02
(58) Field of Classification Search ............ 137/596.2, 137/596.17; 251/129.02, 129.09
See application file for complete search history.

(56) References Cited

U.S. PATENT DOCUMENTS

| | | | | | |
|---|---|---|---|---|---|
| 2,587,356 | A | * | 2/1952 | McPherson | ................. 137/613 |
| 4,369,696 | A | * | 1/1983 | Klatt et al. | .................... 91/465 |
| 4,929,038 | A | * | 5/1990 | Reinartz et al. | ......... 303/119.3 |
| 5,040,853 | A | * | 8/1991 | Burgdorf et al. | ......... 303/119.3 |
| 5,335,983 | A | * | 8/1994 | Beck et al. | ............. 303/119.3 |
| 5,385,396 | A | * | 1/1995 | Beck et al. | ............. 303/119.3 |
| 5,462,344 | A | * | 10/1995 | Jakob et al. | ............. 303/119.3 |
| 6,073,904 | A | * | 6/2000 | Diller et al. | ............. 251/30.03 |
| 6,164,322 | A | * | 12/2000 | Najmolhoda et al. | ....... 137/540 |
| 6,273,122 | B1 | * | 8/2001 | Schudt et al. | .......... 137/315.03 |
| 6,276,663 | B1 | * | 8/2001 | Anderson et al. | ...... 251/129.02 |
| 2002/0059957 | A1 | * | 5/2002 | Frisch et al. | ............. 137/596.2 |
| 2004/0239178 | A1 | * | 12/2004 | Otsuka | ..................... 303/119.3 |

* cited by examiner

*Primary Examiner*—Gregory Huson
*Assistant Examiner*—Craig Schneider
(74) *Attorney, Agent, or Firm*—Kenneth L. Sherman, Esq.; Vic Lin, Esq.; Myers Dawes Andras & Sherman, LLP

(57) ABSTRACT

A solenoid operated valve includes a fluid inlet and a fluid inlet, a common port, a normally open port and a normally closed port combined on an end cap. The valve further includes a coil housing that houses two coils, a first coil and second coil, that are in parallel with each other creating two parallel longitudinal axes for a normally open assembly and a normally closed assembly. The normally open assembly includes a first diaphragm assembly, a plunger rod having barbed ribs on a proximal end thereof, a magnetic pin and a body that is coupled to a distal end of the plunger rod. The normally closed assembly includes a second diaphragm assembly, a plunger and a magnetic post. The first and second coils are simultaneously actuated.

14 Claims, 3 Drawing Sheets

HIGH PRESSURE THREE WAY VALVE

RELATED APPLICATIONS

The present application is related to U.S. Provisional Patent Application Ser. No. 60/527,871, filed on Dec. 8, 2003, which is incorporated herein by reference and to which priority is claimed pursuant to 35 USC 119.

BACKGROUND OF THE INVENTION

1. Field of the Invention

The present invention relates generally to the field of valves and valve systems for physical transport and isolation of liquids and gases. More particular the present invention pertains to a fluidic dispense valve.

2. Description of the Prior Art

Solenoid-operated valves are well known for halting and controlling the flow of fluids through a passage. Most solenoid valves are used as switches, and use coils and metal cores that slide along a coil axis under the influence of a magnetic field. A solenoid valve is an attractive option when fluid systems require a valve to cycle open and closed, and thereby transfer a volume of fluid. Solenoid valves use a generated and collapsing electromagnetic field to engage a valve stem or plunger rod. Another specific characteristic of these valves is whether their normal operating state is open or closed when the energy flux is not actuated.

Traditional 3-way valves include a common port, a normally open port and a normally closed port. Such valves generally have a single coil that actuates a mechanism that connects both the normally open and normally closed sealing areas of a diaphragm that controls the flow of water. This arrangement is very sensitive to adjustment and falls out of adjustment after a relatively short period of time, especially in high-pressure applications.

Solenoid valves are useful in remote areas, rugged environments and hazardous locations because they can be operated automatically. For this reason, they are used in a wide range of applications through many industries. Advancements in micro-fluidic arts such as blood chemistry analysis, drug discovery, DNA sequencing and other technical arts require precision fluid handling which have created the need for progress in the components that control and dispense the fluids. Thus, a need exists for a design that provides a small dispensing volume having the rapid switch time of a traditional 3-way valve and the reliability of separate normally open and normally closed valves combined to operate as one 3-way valve.

BRIEF SUMMARY OF THE INVENTION

A solenoid operated valve that includes a fluid inlet and a fluid outlet, a common port, a normally open port and a normally closed port combined on an end cap. The end cap has a side that presses against the coil housing to form a fluid tight seal and defines two sealing apexes. The valve further comprises a coil housing that houses two coils, a first coil and second coil, in parallel with each other creating two parallel longitudinal axes for a normally open assembly and a normally closed assembly.

The normally open assembly comprises a first coil that is wrapped around a first bobbin that forms a magnetic flux field within the housing and a magnetic plunger rod configured to transverse axially inside of the first coil housing. In a preferred embodiment, the magnetic plunger rod is coupled to a body by a threaded connection, whereby when the coil is actuated, the body is attracted to a stationary magnetic pin that lies transversely between the plunger rod and the body. The magnetic reaction causes the proximal end of the plunger rod to move transversely towards the proximal end of the valve and come in contact with a first diaphragm assembly. This causes the normally open assembly to become closed.

The normally closed assembly comprises a second coil that is wrapped around a second bobbin and simultaneously forms a magnetic flux field with the first coil. Within the second bobbin is a magnetic post, a plunger and a spring that transversely holds a second diaphragm against a sealing apex on the end cap when the coil is de-actuated. When actuated, the magnetic post attracts the plunger and pulls the plunger and the second diaphragm away from the sealing apex on the end cap, causing the normally closed assembly to become open simultaneously with the normally open assembly becoming closed.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
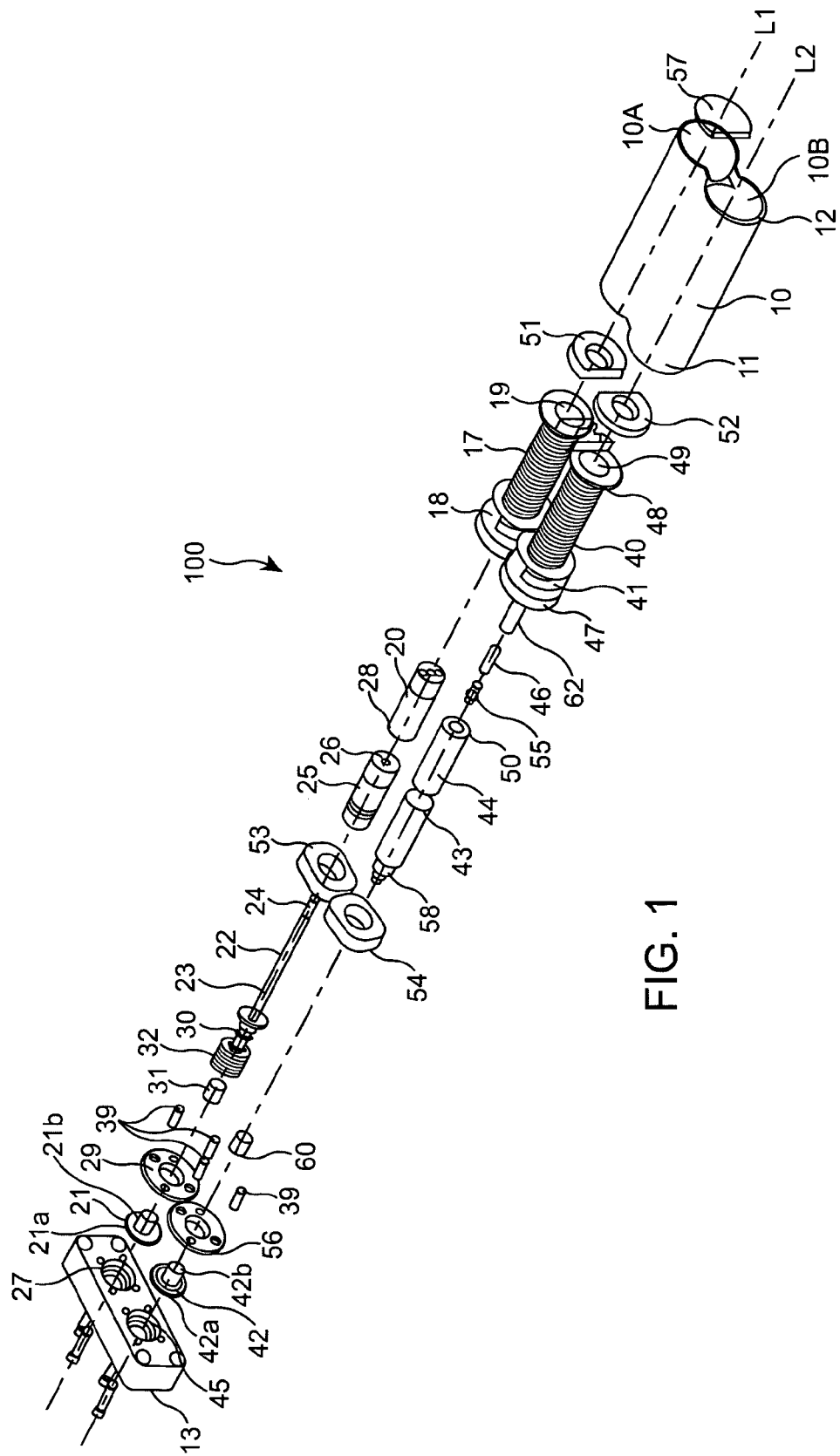
FIG. 1 shows an exploded view of a preferred high pressure three-way valve according to the present invention.
Figure 2:
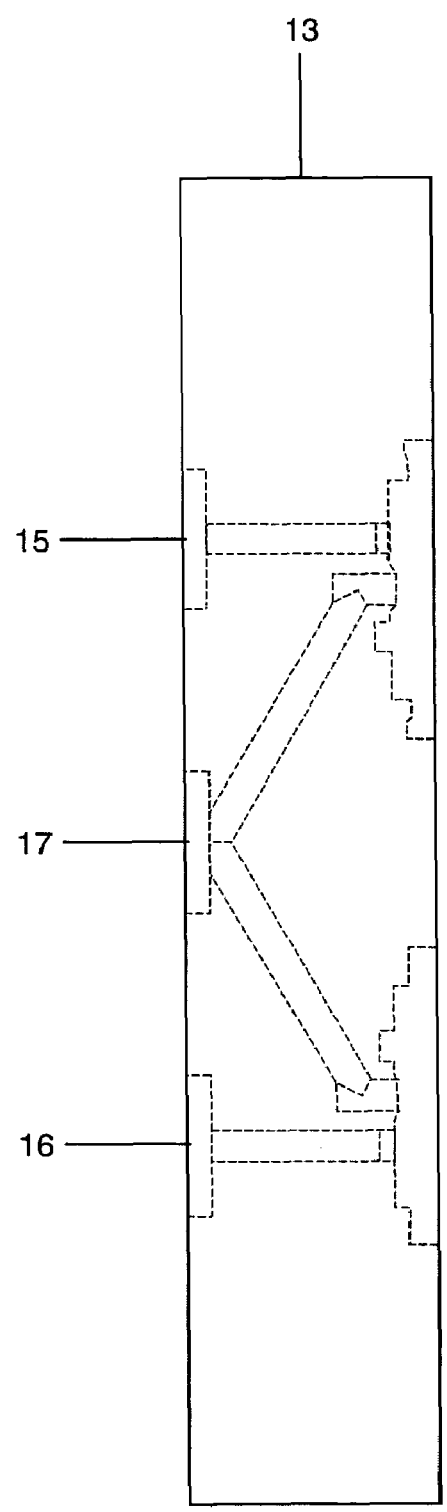
FIG. 2 shows a partially see through view of a preferred end cap according to the present invention.

Referring initially to FIG. 1, an exploded view of a preferred embodiment of a high pressure three-way valve, referred to generally as 100, the valve 100 comprises external components including a coil housing 10 and an end cap 13. The coil housing 10 has a proximal end 11 and a distal end 12 and defines two separate parallel chambers 10A and 10B. When assembled, the end cap 13 is located at the proximal end 11 of the housing and, as is best shown in FIG. 2, includes channels forming a fluid inlet port 15, a fluid outlet port 16, and a common fluid port 17.

The fluid inlet 15 is also termed the N.O. (normally open) outlet and the fluid outlet 16 is also termed the N.C. (normally closed) outlet.

FIG. 1 further shows the chamber 10A of the housing 10 located at what is referred to as the normally open side of a valve and disposed about a first longitudinal center axis L1. A first bobbin 18 is within the housing 10 and wrapped with a first solenoid coil 17. The first bobbin 18 defines a first inner hollow section 19. Within the first inner hollow section 19 of the first bobbin 18 is a movable body 20 acting as a ferrous component and a first diaphragm assembly 21 adapted to be coupled to a plunger rod 22 having a proximal end 23 and a distal end 24. The first diaphragm assembly 21 is comprised of a keeper 29 held on the end cap 13 by rivets 39. In a preferred embodiment, the distal end 24 of the plunger rod 22 is threadably coupled to the movable body 20 and is transversely moveable through a center aperture 26 of a stationary magnetic pin 25 and is movable therethrough. The threaded connection between the body 20 and the plunger rod 22 is also used to obtain a desired pressure rating and has the ability to control and adjust the flow amount, dispense volume and dispense speed.

Figure 3:
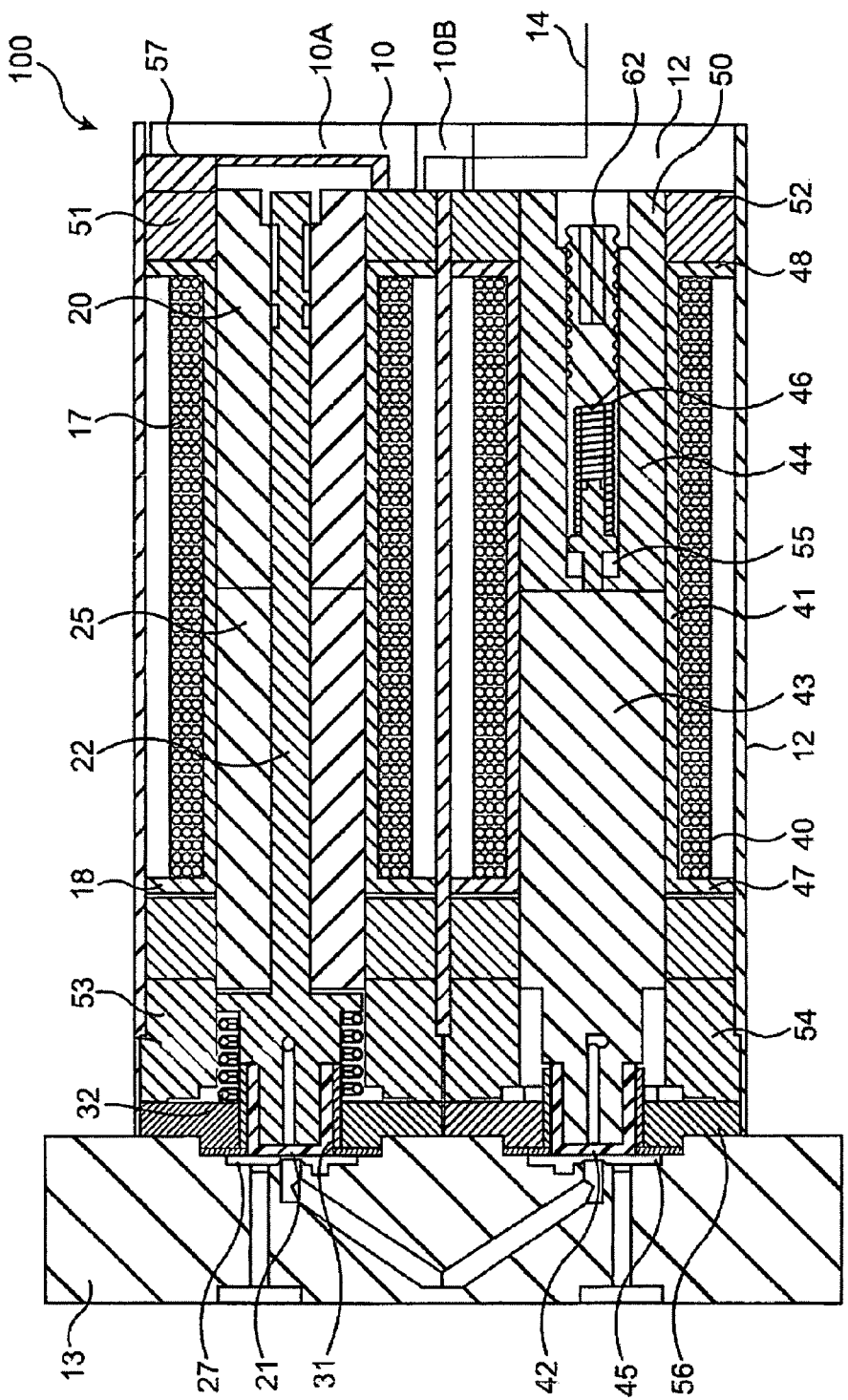
FIG. 3 shows an isometric view of a preferred high pressure three-way valve during actuation according to the present invention.

As is best shown in FIG. 3, electrical leads 14 located at the distal end of the housing 10 provide power to energize the coil creating a magnetic flux field. When chamber 10A is actuated and the magnetic flux field is created, the body 20 becomes attracted to the stationary magnetic pin 25. The threadable connection between the plunger rod 22 and the body 20 then causes the plunger rod 22 to move transversely through the magnetic pin 25, wherein the proximal end 23 of the plunger rod is 22 adapted to connect with the first diaphragm 21 assembly and push the first diaphragm assembly 21 against the first sealing apex 27 on the end cap, closing the normally open side 10A. In a preferred embodiment, the stationary magnetic pin 25 is located transversely adjacent to the body 20 at a proximal end 28 thereof. The first diaphragm assembly 21 comprises a sealing side 21a and a receiving side 21b, wherein the sealing side is tightly pressed against the first sealing apex 27 when the first coil 17 is actuated.

In a preferred embodiment the plunger rod 22 has barbed ribs 30 on a proximal end 23 thereof. When the solenoid coil 17 is actuated, the ribs 30 on the rod 22 are adapted to engage a first sleeve 31 that fits within a first spring 32 between the diaphragm keeper 29 and the barbed ribs 30. During activation, the barbed ribs 30 of the plunger rod 22 are releasably coupled to the sleeve 31 within the first spring 32. In the normal state when the first coil 17 is not energized, the first spring 32 biases the rod 22 distally lifting the first diaphragm assembly 21 off of the first sealing apex 27 to open the normally open outlet 15. In the actuated state when the first coil 17 is energized, the rod 22 is forced against the bias of the spring 32 to move the diaphragm assembly 21 into sealing engagement with the sealing apex 27. This closes the normally open outlet 15.

Chamber 10B houses what is referred to as the normally closed side of a valve and is disposed about a second longitudinal center axis L2. A second bobbin 41 within the housing 10 is wrapped with a second solenoid coil 40. The second bobbin 41 has a proximal end 47 and a distal end 48 and defines a second inner hollow section 49. When assembled, a second diaphragm assembly 42 located within the second bobbin 41 is coupled to the end cap 13 with a second keeper 56 and rivets 39. The second diaphragm assembly 42, which includes a sealing side 42a and a receiving side 42b, is adapted to be coupled to a magnetic plunger 43 when the second solenoid coil 40 is de-actuated. The proximal end of the magnetic plunger 43 is coupled to the receiving side 42b of the second diaphragm 42 with a second sleeve 60. A stationary magnetic post 44 lies transversely adjacent to the plunger 43 relative to the housing.

As best shown in FIG. 3, the valve 100 further comprises, coil-to-coil wiring or electrical leads 14 connected to the first and second bobbin 18, 41 through an electrical lead box (not shown) and electrically connected to the first and second coils 17, 40 to provide actuation.

As shown in FIG. 3, during actuation, the magnetic flux field causes the plunger 43 to be attracted to the stationary magnetic post 44 and to travel towards the distal end of the housing 10. This disengages the plunger 43 from the second diaphragm 42, causing the normally closed side 10B to open.

In the preferred embodiment, chamber 10B further includes a second spring 46 having a linear spring force that holds the second diaphragm 42 against the second sealing apex 45 on the end cap 13. This relationship characterizes the normally closed state when the second coil 40 is de-actuated. The second spring 46 is configured to fit between a distal end 48 of the second bobbin 41 and a distal end 50 of a stationary magnetic post 44, with a guide pin 55 in between the second spring 46 and the magnetic post 44. A set screw 62 about the distal end 12 of the body and is held against the second spring 46.

In the preferred embodiment, the first and second coils 17, 40 are simultaneously actuated, thereby creating a magnetic flux field in both chamber A and chamber B simultaneously.

In the preferred embodiment, chambers 10A and 10B further comprise a first and second rear magnetic discs 51, 52 at the distal end 12 of the housing 10 configured to fit within the housing 10, the first and second rear magnetic discs 51, 52 shape the magnetic flux field when the first and second coils 17, 40 are actuated.

The valve 100 further comprises a first front magnetic disc 53 on the normally open side adapted to fit over the magnetic post 25, and a second front magnetic disc 54 on the normally closed side adapted to fit over the plunger 43. The housing 10 further comprises a cap 57 on the normally open side 10A to keep potting compound, i.e. a UV activated adhesive, from running into the normally open side A.

In the preferred embodiment, the magnetic pin 25 and magnetic post 43, body 20, plunger rod 22, coil housing 10, first and second front magnetic discs 53, 54 and rear magnetic disc 51, 52, are made from 400-series stainless steel chosen for its magnetic properties and its ability to resist corrosion. Also, in the preferred embodiment, the plunger rod 22 is made out of brass, but it is understood that it can be made out of any metal. The first and second diaphragms 21, 42 are preferably made from any elastomer, and the end cap 13 is preferably made from Polyetheretherketon (PEEK) a high temperature resistant engineered thermoplastic chosen for its excellent chemical and fatigue resistance plus thermal stability. The body 10 and first and second bobbins 18 and 41 are preferably made from a high strength moldable plastic.

Many alterations and modifications may be made by those having ordinary skill in the art without departing from the spirit and scope of the invention. For example, the magnetic pin 25 and post 43, body 20, plunger rod 22, coil housing 10, the first and second front magnetic discs 53, 54 and rear magnetic discs 51 and 52, could also be made from 300-series stainless steel. It should also be noted that although in the preferred embodiment, chambers 10A and 10B react simultaneously when actuated, chambers 10A and 10B can be made to react independently of each other as well.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

I claim:

1. A three-way valve, comprising:
   a coil housing having a proximal end, a distal end, two separate parallel chambers, the two parallel chambers being adapted to hold a first coil defining a normally open side and a second coil defining a normally closed side, the normally open side defining a first longitudinal axis and including a first diaphragm assembly adapted to be coupled to a plunger rod, the normally closed side defining a second longitudinal axis and including a second diaphragm assembly adapted to be coupled to a magnetic plunger;
   an end cap having a side that presses against the coil housing during assembly so as to form a fluid tight seal, the end cap defining a first sealing apex and second sealing apex; and
   at least one barbed rib disposed at the proximal end of the plunger rod and moveable with the plunger rod to engage the first diaphragm assembly and to move the first diaphragm assembly into sealing engagement with the first sealing apex of the end cap,
   wherein the plunger rod connects the first diaphragm assembly with a first spring, the first spring having properties for maintaining the barbed rib off of the first diaphragm assembly when the first coil is de-energized, and for lifting the barbed rib onto the first diaphragm assembly when the first coil is energized.

2. The three-way valve of claim 1, further comprising:
   a first bobbin disposed about the first longitudinal axis and defining a first inner hollow section, the first bobbin configured to fit within the coil housing, the first coil being wrapped around the first bobbin; and
   a second bobbin disposed about the second longitudinal axis, the second bobbin defining a second inner hollow section and laying parallel to the first bobbin within the coil housing, the second coil being wrapped around the second bobbin.

3. The three-way valve of claim 1, wherein during actuation, the first and second coils are energized simultaneously, to create a magnetic field that forces the plunger rod to traverse axially and move toward the first diaphragm assembly and that simultaneously forces the plunger to transverse axially and move away from the second diaphragm assembly.

4. The three-way valve of claim 1, wherein the normally closed side further comprises a plunger that is adapted to be coupled to the second diaphragm assembly and a second spring that holds the second diaphragm against the sealing apex on the end cap when the second coil is de-actuated, the second spring being configured to fit within the second bobbin between a proximal end thereof and a stationary magnetic post.

5. The three-way valve of claim 1, wherein when the second coil is actuated the plunger becomes magnetically attracted to a stationary magnetic post causing the plunger to traverse axially away from the second diaphragm assembly and towards the distal end of the housing, thereby opening the normally closed side.

6. The three-way valve of claim 1, wherein the plunger rod is coupled to the body, so as to allow for an adjustable pressure rating.

7. The three-way valve of claim 1, further comprising first and second rear magnetic discs disposed around the respective parallel chambers, the first and second rear magnetic discs having properties for shaping the magnetic flux field when the coils are actuated.

8. The three-way valve of claim 1, wherein the end cap further includes channels defining a fluid inlet and a fluid outlet.

9. The three-way valve of claim 1, further comprising a first front magnetic disc on the normally open side adapted to fit over the magnetic post and a second front magnetic disc on the normally closed side adapted to fit over the plunger.

10. The three-way valve of claim 1, wherein the normally open side further comprises a body within the first hollow section of the first bobbin, the body being transversely adjacent to a stationary magnetic pin and threadably coupled to the plunger rod at a distal end thereof.

11. The three-way valve of claim 10, wherein upon actuation of the first coil, the body is attracted to the stationary magnetic pin causing the plunger rod to move transversely through the magnetic pin, the proximal end of the plunger rod being adapted to connect with the first diaphragm assembly, so as to close the normally open side.

12. A three way valve, comprising:
    a fluid inlet and a fluid outlet;
    a coil housing having a proximal end and a distal end, the housing defining a first longitudinal axis on a normally open side of the valve and a second longitudinal axis on a normally closed side of the valve, the first and second longitudinal axes lying parallel to each other;

a first solenoid coil wrapped around a first bobbin on the first longitudinal axis, the first bobbin defining a first inner hollow section;

a second solenoid coil wrapped around a second bobbin on the second longitudinal axis, the second bobbin defining a second inner hollow section;

the first and second solenoid coils being configured to fit inside of the coil housing, the solenoid coils having properties for generating a magnetic field when actuated;

a magnetic plunger rod on the normally open side, configured to traverse axially along the first longitudinal axis, wherein upon actuation of the first solenoid coil, the plunger rod travels toward the proximal end of the housing, becoming engaged with a first diaphragm assembly;

a plunger on the normally closed side configured to traverse axially along the second longitudinal axis, wherein upon actuation of the second solenoid coil, the plunger travels toward the distal end of the housing, becoming disengaged with a second diaphragm assembly; and wherein the magnetic plunger rod and the plunger move simultaneously with each other when the magnetic field is generated, wherein the first diaphragm assembly receives a first sleeve that engages a first spring, the first sleeve being disposed between a diaphragm keeper and a plunger barb, the first spring lifting the plunger barb onto the first diaphragm assembly when the first coil is actuated.

13. The three-way valve of claim 12, further comprising a stationary magnetic post on the normally closed side of the valve that attracts the plunger towards the distal end of the housing during coil actuation, so as to disengage the plunger from the second diaphragm assembly.

14. The three-way valve of claim 12, further comprising: a second sleeve biased toward the second diaphragm assembly by a second spring, and being removable from the second diaphragm assembly against the bias of the second spring when the second coil is actuated.

* * * * *